United States Patent
Versteyhe

(10) Patent No.: US 6,872,164 B2
(45) Date of Patent: Mar. 29, 2005

(54) CLUTCH BRAKING IN A MULTI-SPEED TRANSMISSION

(75) Inventor: Mark R J Versteyhe, Oostkamp (BE)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/677,928

(22) Filed: Oct. 2, 2003

(65) Prior Publication Data

US 2004/0094381 A1 May 20, 2004

Related U.S. Application Data

(60) Provisional application No. 60/427,812, filed on Nov. 20, 2002.

(51) Int. Cl.$^7$ ............................................. B60K 41/20
(52) U.S. Cl. ..................... 477/83; 477/107; 192/3.61; 192/3.63; 192/48.4
(58) Field of Search ................................. 774/333, 335; 192/3.61, 3.63, 48.3, 48.4; 477/60, 62, 83, 107; 701/67

(56) References Cited

U.S. PATENT DOCUMENTS

| | | | | |
|---|---|---|---|---|
| 4,471,670 A | * | 9/1984 | Muller | 74/731.1 |
| 5,213,551 A | * | 5/1993 | Antonov | 475/257 |
| 5,676,026 A | * | 10/1997 | Tsuboi et al. | 74/606 R |
| 6,044,728 A | * | 4/2000 | Pecceu | 74/730.1 |

* cited by examiner

Primary Examiner—Saul Rodriguez
(74) Attorney, Agent, or Firm—Marshall & Melhorn LLC

(57) ABSTRACT

An apparatus for clutch braking in a multi-speed transmission comprising a prime mover, a transmission system, an output shaft and a torque converter. The transmission comprises a first stage and a second stage wherein the first stage comprises at least two range clutches and the second stage comprises at least two direction clutches. The range and direction clutches are slipped, locked and/or engaged to brake the system.

19 Claims, 1 Drawing Sheet

CLUTCH BRAKING IN A MULTI-SPEED TRANSMISSION

RELATED APPLICATION

This application is claiming the benefit, under 35 U.S.C. §119(e), of the provisional application filed Nov. 20, 2002, under 35 U.S.C. §111(b), which was granted Ser. No. 60/427,812, and is hereby incorporated by reference.

FIELD OF THE INVENTION

The present invention relates to an apparatus for clutch braking in a multi-speed transmission of a vehicle.

SUMMARY OF THE INVENTION

The present invention is directed toward an apparatus for clutch braking in a multi-speed transmission. The invention comprises a prime mover, a transmission system, an output shaft and a torque converter. The transmission system comprises a first and a second stage. The first stage comprises at least two range clutches and the second stage comprises at least two direction clutches.

In one embodiment, transmission system braking is achieved by locking one of the range clutches and one of the direction clutches. Also, at least one other range clutch and at least one other direction clutch are slipped.

In a second embodiment, at least two range clutches are locked together and all of the direction clutches are slipped about the locked range clutches to brake the transmission system.

In a third embodiment, the range clutches of the transmission are opened, one of the direction clutches is locked and the remaining direction clutch is slipped to brake the transmission system.

BRIEF DESCRIPTION OF THE DRAWINGS

Advantages of the present invention will become readily apparent to those skilled in the art from the following detailed description when considered in the light of the accompanying drawing in which.

DETAILED DESCRIPTION OF THE PREFERRED EMBODIMENTS

Figure 1:
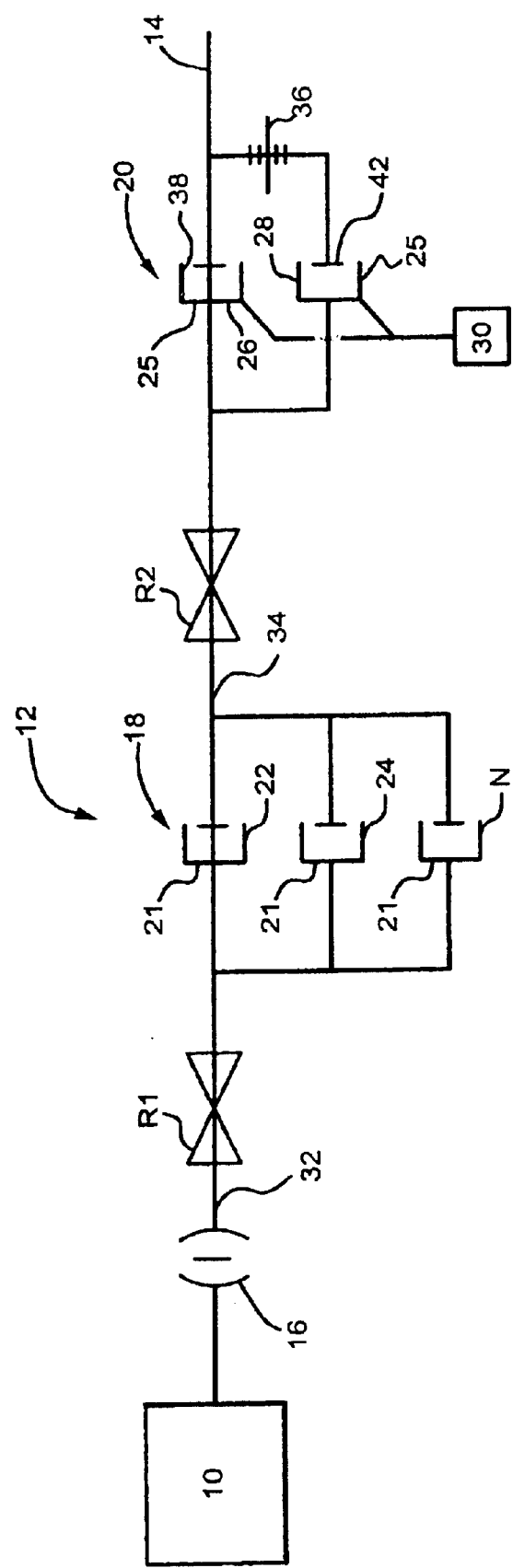
FIG. 1 is a schematic view of the present invention.

It is to be understood that the invention may assume various alternative orientations and step sequences, except where expressly specified to the contrary. It is also to be understood that the specific devices and processes illustrated in the attached drawing, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Referring now to FIG. 1, a first preferred embodiment of the present invention is schematically depicted comprising a prime mover 10, a transmission system 12, an output shaft 14 and a torque converter 16 of a vehicle (not shown). The prime mover 10 is preferably an internal combustion engine as known to those skilled in the art. In the preferred embodiment, the transmission system 12 comprises a first stage 18 and a second stage 20. The present invention also applies to transmission systems comprising more than two stages. The first stage 18 comprises at least two range clutches 21. The range clutches 21 may be such as a first gear clutch 22, a second gear clutch 24, or any number of additional gear clutches N, as known to those skilled in the art. Although only three gear clutches are described and depicted, it is well within the scope of the present invention to have more or fewer gear clutches.

The second stage 20 comprises at least two direction clutches 25. The direction clutches 25 may be such as a forward direction clutch 26 and a reverse direction clutch 28, although those skilled in the art know that direction clutches 25 can also comprise at least forward high and forward low and reverse high and reverse low.

Although the present invention is described as having the first stage 18 adjacent the torque converter 16 and the second stage 20 adjacent the output shaft 14, it is well within the scope of the present invention to switch the position of the first stage 18 and the second stage 20.

Those skilled in the art also appreciate that the direction clutches 25 are designed with a higher heat absorbing capacity and a higher heat removing capacity as compared to the range clutches 21. The higher heat absorbing and removing capacity of the direction clutches 25 is due to the greater mass of the clutches 25 and the additional cooling fluid flow provided to each of the clutches 25.

The present invention also may include at least one selectively operated pump 30 in fluid communication with at least each of the direction clutches 25 of the transmission system 12 to provide lubricating fluid to the clutches 25. The pump 30 circulates cooling fluid, in addition to the fluid with the transmission system 12, through the clutches 25 thereby increasing their capacity to absorb and remove heat from the clutches 25. The pump 30 may be selectively automatically or manually engaged to provide fluid to one or more braking clutches 25.

The torque converter 16 is well known to those skilled in the art and connects the prime mover 10 to the transmission system 12 through a turbine shaft 32. Other components of the invention comprise an intermediate shaft 34 connecting the first stage 18 with the second stage 20. The output shaft 14 connects the second stage 20 with the remaining drivetrain (not shown) of the vehicle. A reverse idler gear 36 may also be connected to the reverse clutch 28 to the output shaft 14 as known to those skilled in the art.

Preferably, at least one gear ratio R1, as known to those skilled in the art, is located between the turbine shaft 32 and a range gear 21. Similarly, at least one gear ratio R2, as known to those skilled in the art, is located between a range gear 21 and the intermediate shaft 34.

In the first preferred embodiment, at least one of the range clutches 21 and one of the directional clutches 25 are kinematically locked to one another. Contemporaneously, at least one of the other range clutches 21 is slipped with the locked range clutch 21 and at least one other directional clutch 25 is slipped with the locked directional clutch 25. The slipping range clutch 21 and direction clutch 25 effectively brake the transmission system 12 by slowing the locked range 21 and direction clutch 25, respectively.

In the present invention, the direction clutches 25 comprise at least one forward clutch 38 and at least one reverse clutch 42. The forward clutch 38 is kinematically locked with the first gear clutch 22 and the at least one other gear clutch, such as N or 24, is slipped with the locked first gear clutch 22 and the reverse clutch 42 is slipped with the locked forward clutch 38. If there are any other clutches in the second stage, such as a forward high gear and/or a forward low gear, they may also be slipped to provide braking.

Additional braking to the transmission system 12 is provided if the engine 10 is de-throttled to a relatively low revolutions per minute setting. The low setting allows the turbine shaft 32 to communicate rotational energy from the locked range clutch 22 to the torque converter 16 where the rotational energy is absorbed.

A second embodiment differs from the first embodiment since the engine 10 has been de-throttled to reduce the revolutions per minute. When the engine 10 slows, the kinematic link which existed between the first 18 and second 20 stages is opened. At least two of the range clutches 21 are then locked together so that the relative motion between them is zero. Any combination of range clutches 21 can be locked, so it need not be just first gear clutch 22 and second gear clutch 24. Next, the directional clutches 25 are slipped about the locked range clutches 21 to brake the transmission system 12.

Preferably, in this embodiment, the direction clutches 25 comprise at least one forward clutch 38 and at least one reverse clutch 42, although other direction clutches known to those skilled in the art may be used. The forward clutch 38 and the reverse clutch 42 are slipped about the at least two locked range clutches 21 to brake the transmission system 12. Thus, the heaviest clutches of the transmission system 12 can be used to absorb and/or remove heat for braking the system.

A third embodiment differs from the above-described embodiments since the kinematic link between the first stage 18 and the second stage 20 is broken and the range clutches 21 are opened. The engine 10 can perform independently in this embodiment since the torque converter 16 is also opened. The engine 10 can increase in revolutions per minute to supply power to auxiliary hydraulics and/or to supply cooling fluid to the transmission system 12.

Preferably, one of the smaller direction clutches 25 is locked and any other direction clutches 25 slip. In one embodiment, the reverse clutch 42 is locked and the and the forward clutch 38 is slipped. In another embodiment where the direction clutches 25 include a forward high or a forward low and/or a reverse high or a reverse low, it is preferred that one of those clutches become locked as they will likely be the smallest direction clutches 25. Those skilled in the art appreciate that it is preferred to lock the smallest direction clutch 25 as it cannot remove and/or absorb as much heat as a larger directional clutch 25. The remaining unlocked directional clutches 25 can the be slipped to slow the transmission system 12.

Those skilled in the art can also appreciate that to increase the braking available in the transmission system 12, all of the direction clutches 25 can be slipped.

Those skilled in the art will also readily appreciate that the above-described multi-speed transmission can brake the vehicle by downshifting from a higher range gear to a lower range gear. Downshifting is a well-known technique wherein the engine 10 is de-throttled to reduce engine revolutions per minute. Moving from a higher range gear to a lower range gear and engaging the lower range gear causes the turbine side of the torque converter 16 to rotate at a higher speed than when the turbine side was driven by the lower range gear. With the lower range gear engaged, the turbine rotates at a higher rate than the side of the torque converter 16 connected to the engine 10. The rotational energy of the turbine side is in effect braked by the slower moving engine side thus slowing the entire transmission system 12.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. An apparatus for clutch braking in a multi-speed transmission, comprising:
   a prime mover;
   a transmission system comprising,
      a first stage and a second stage, said first stage comprising at least two range clutches and said second stage comprising at least two direction clutches, wherein one of said range clutches and one of said direction clutches are kinematically locked and at least one other range clutch is slipped and at least one other direction clutch is slipped to brake said transmission system;
   an output shaft connected to said second stage; and
   a torque converter connecting said prime mover and said transmission.

2. The apparatus of claim 1, wherein said direction clutches comprise at least one forward clutch and at least one reverse clutch.

3. The apparatus of claim 1, wherein said direction clutches comprise at least one forward clutch and said at least one reverse clutch and wherein said forward clutch is kinematically locked with one of said range clutches and said reverse clutch and at least one of said other range clutches are slipped to brake said transmission system.

4. The apparatus of claim 1, wherein said prime mover is an internal combustion engine that is de-throttled to provide braking to said transmission system through said torque converter.

5. The apparatus of claim 1, wherein said directional clutches have a higher heat absorbing capacity and a higher heat removing capacity than said range clutches.

6. The apparatus of claim 1, wherein at least one selectively operated pump in fluid communication with at least said directional clutches provides lubricating fluid to said clutches.

7. An apparatus for clutch braking in a multi-speed transmission, comprising:
   a prime mover;
   a transmission system comprising,
      a first stage and a second stage, said first stage comprising at least two range clutches and said second stage comprising at least two direction clutches, wherein at least two of said range clutches are locked together and said directional clutches are slipped about said range clutches to brake said transmission system;
   an output shaft connected to said second stage; and
   a torque converter connecting said prime mover and said transmission.

8. The apparatus of claim 7, wherein at least two of said range clutches are locked together so that relative motion between them is zero.

9. The apparatus of claim 7, wherein any combination of said range clutches can be locked together.

10. The apparatus of claim 7, wherein said directional clutches comprise at least one forward clutch and at least one reverse clutch which are both slipped about said at least two locked range clutches to brake said transmission system.

11. The apparatus of claim 7, wherein said directional clutches have a higher heat absorbing capacity and a higher heat removing capacity than said range clutches.

12. The apparatus of claim 7, wherein at least one selectively operated pump in fluid communication with at least said directional clutches provides lubricating fluid to said clutches.

13. An apparatus for clutch braking in a multi-speed transmission, comprising:
  a prime mover;
  a transmission system comprising,
    a first stage and a second stage, said first stage comprising at least two range clutches and said second stage comprising at least two direction clutches, wherein said range clutches are opened and one of said directional clutches is locked, and the remaining direction clutches are slipped to brake said transmission system;
  an output shaft connected to said second stage; and
  a torque converter connecting said prime mover and said transmission.

14. The apparatus of claim 13, wherein the smallest of the at least three direction clutches is locked.

15. The apparatus of claim 13, wherein a forward direction clutch is locked while at least a reverse direction clutch is slipped.

16. The apparatus of claim 13, wherein said torque converter remains open.

17. The apparatus of claim 13, wherein said prime mover is an internal combustion engine that operates independently of said transmission system.

18. The apparatus of claim 13, wherein all of said direction clutches are slipped to brake said transmission system.

19. The apparatus of claim 13, wherein at least one selectively operated pump in fluid communication with at least said directional clutches provides lubricating fluid to said clutches.

* * * * *